United States Patent

Liberman et al.

[11] Patent Number: 5,860,282
[45] Date of Patent: Jan. 19, 1999

[54] PROCESS FOR PREPARING ICE SUBSTITUTES

[75] Inventors: Barnet L. Liberman, New York, N.Y.; Peter H. Glidden, Lubec, Me.

[73] Assignee: Winterlab Limited, New York, N.Y.

[21] Appl. No.: 898,697

[22] Filed: Jul. 24, 1997

[51] Int. Cl.[6] .............................................. F25D 13/06
[52] U.S. Cl. ............................ 62/63; 62/64; 62/374; 62/380; 62/530
[58] Field of Search .................. 62/63, 64, 66, 62/345, 356, 374, 380, 381, 529, 530

[56] References Cited

U.S. PATENT DOCUMENTS

| | | | |
|---|---|---|---|
| 1,965,624 | 7/1934 | Young | 62/374 |
| 2,951,353 | 9/1960 | Morrison | 62/380 |
| 3,479,833 | 11/1969 | Waldin | 62/374 |
| 3,488,976 | 1/1970 | Hirahara et al. | 62/356 |
| 3,832,864 | 9/1974 | Rasovich | 62/380 |
| 4,030,898 | 6/1977 | Morita | 62/345 |
| 4,858,445 | 8/1989 | Rasovich | 62/380 |
| 5,259,212 | 11/1993 | Engler | 62/374 |
| 5,313,809 | 5/1994 | Isaacson et al. | 62/530 |
| 5,582,028 | 12/1996 | Rilling et al. | 62/530 |
| 5,623,830 | 4/1997 | Knight et al. | 62/63 |

*Primary Examiner*—William E. Tapolcai
*Attorney, Agent, or Firm*—Cohen, Pontani, Lieberman & Pavane

[57] ABSTRACT

A process of freezing a belt of encapsulated ice substitute is provided. The process for freezing the ice substitute belt generally includes the steps of preparing a capsule belt with a plurality of capsules, each capsule containing a thermal controlling agent which is a liquid in a predetermined temperature range; preparing a brine including a cruciferous oil, salts and a glycol and cooling the brine; feeding the belt into an apparatus which contains the cooled brine and passing the belt through the brine; adjusting the speed to the extent sufficient for the thermal controlling agent to become solidified. The travelling speed of the ice substitute belt is adjusted depending on the composition of the thermal controlling agent.

21 Claims, 4 Drawing Sheets

PROCESS FOR PREPARING ICE SUBSTITUTES

BACKGROUND OF THE INVENTION

1. Field of the Invention

This invention relates generally to an apparatus for freezing an encapsulated ice substitute and a process for freezing such ice substitutes using the invented apparatus, and in particular, to a process for freezing a capsule belt having a plurality of rows of capsules, each of which contains a thermal controlling agent.

2. Description of the Related Art

The use of ice or dry ice as a coolant material serves to preserve organic material and inhibits the growth of many harmful micro organisms.

The major drawback to using ice as a coolant material is that it melts. If the ice is used as a packing material, the space taken up by the ice when melted will be less than when it is frozen, so that it will no longer be an effective packing material. The melted ice is easily contaminated by microorganisms and, since it will be in intimate contact with the products it is intended to protect, these are also liable to become contaminated. The products may also be damaged by getting wet. The melted ice will also allow the products to move or slosh around in the container, risking damage by impact with the walls of the container.

Dry ice has similar problems in that it sublimes into gaseous $CO_2$ with time. The gas must be dissipated and, with the solid $CO_2$ gone, the product will no longer be packed against movement in its container. Also both ice and dry ice can be used only once, adding to the expense of such thermal storage.

U.S. Pat. No. 4,931,333 discloses a method for making an ice substitute which is an improvement over known coolants such as ice and dry ice. According to that invention, the ice substitute comprises a plurality of capsules each having a flexible outer skin containing a thermal controlling agent which can maintain a predetermined temperature range for an extended period of time. The thermal controlling agent contained in the capsules is a eutectic solution which has the capacity to absorb or release heat with little or no change in temperature while in the process of changing from one physical state to another, e.g. solid to liquid or vice versa. The capsules must first be charged with the eutectic solution and frozen to the phase change temperature or lower before being subjected to the intended use. However, charging or freezing such ice substitute to the phase change temperature is costly and time consuming because the process can take up to 20 hours using the conventional blast freezing method. Moreover, the equipment for blast freezing the ice substitute is large and inconvenient to operate.

Methods for quick freezing vital body fluids such as sperm, eggs, zygotes, blood and the like, for freezing human tissue and organs, and for freezing other biological materials are known.

U.S. Pat. No. 4,401,909 discloses a method of freezing fishery products. The method includes the steps of preparing a brine containing rapeseed oil, propylene glycol, calcium chloride and water, cooling the brine and immersing the seafood in the cooled brine until it is frozen. A process for quick freezing of meat such as beef, poultry, pork, fish and the like in a similar brine is disclosed and claimed in U.S. Pat. No. 4,654,217 issued to the same inventor.

U.S. Pat. No. 4,657,768 discloses a freezing method for perishable foods which includes placing a perishable food in a heat conducting container. The opposite surface of the heat conducting container is then placed into contact with a cooled brine or a liquified gas. Accordingly, the perishable food is frozen quickly without immersion of food in the cooled brine or liquified gas.

U.S. Pat. No. 4,689,963 relates to a method of freezing foods, in which a layer of a rapeseed oil containing brine is placed in the heat conducting container along with the perishable food.

U.S. Pat. No. 4,840,034 discloses a method of freezing body fluids for extended storage. The method includes the steps of preparing a brine including a suitable oil, generally a cruciferous oil; cooling the brine to a temperature between about −22° and about −43.6° F. The brine generally includes a glycol, a salt and water in addition to the suitable oil.

U.S. Pat. No. 4,840,035 discloses a method of freezing tissue for cytological or histological examination. The method uses a brine similar to that disclosed in U.S. Pat. No. 4,840,034.

U.S. Pat. No. 5,001,047 also discloses a method to chill human organs and maintain the viability of the organs, employing a brine similar to that used in U.S. Pat. No. 4,840,034.

There is no teaching or suggestion in any of these patents that these processes can be used to make ice substitutes such as capsule belts or sheets in a convenient and economical fashion. The inventor has made this discovery which presently speeds up the process and markedly reduces the cost. Accordingly, it is desirable to provide a process for quick freezing ice substitutes.

SUMMARY OF THE INVENTION

Therefore, an object of the present invention is to provide an apparatus suitable for freezing ice substitutes in a convenient and economical fashion.

Another object of the present invention is to provide a process for freezing ice substitute belts or sheets using the invented apparatus.

A further object of the present invention is to provide a process for freezing encapsulated ice substitute belts containing a plurality of rows of capsules, each of which contains a thermal controlling agent.

According to the present invention, the process for freezing ice substitutes generally includes the steps of preparing an ice substitute belt or sheets with a plurality of rows of capsules containing a thermal controlling agent which is liquid in a predetermined temperature range; preparing a brine and cooling the brine to a temperature between about −22° and −43.6° F.; feeding the ice substitute belt into an apparatus which contains the cooled brine and moving the ice substitute belt through the brine at a speed that permits immersion for a sufficient time for the thermal controlling agent within the capsules to become solidified. The moving speed of the capsule sheet can be adjusted according to different compositions of the thermal controlling agent.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

Figure 1:
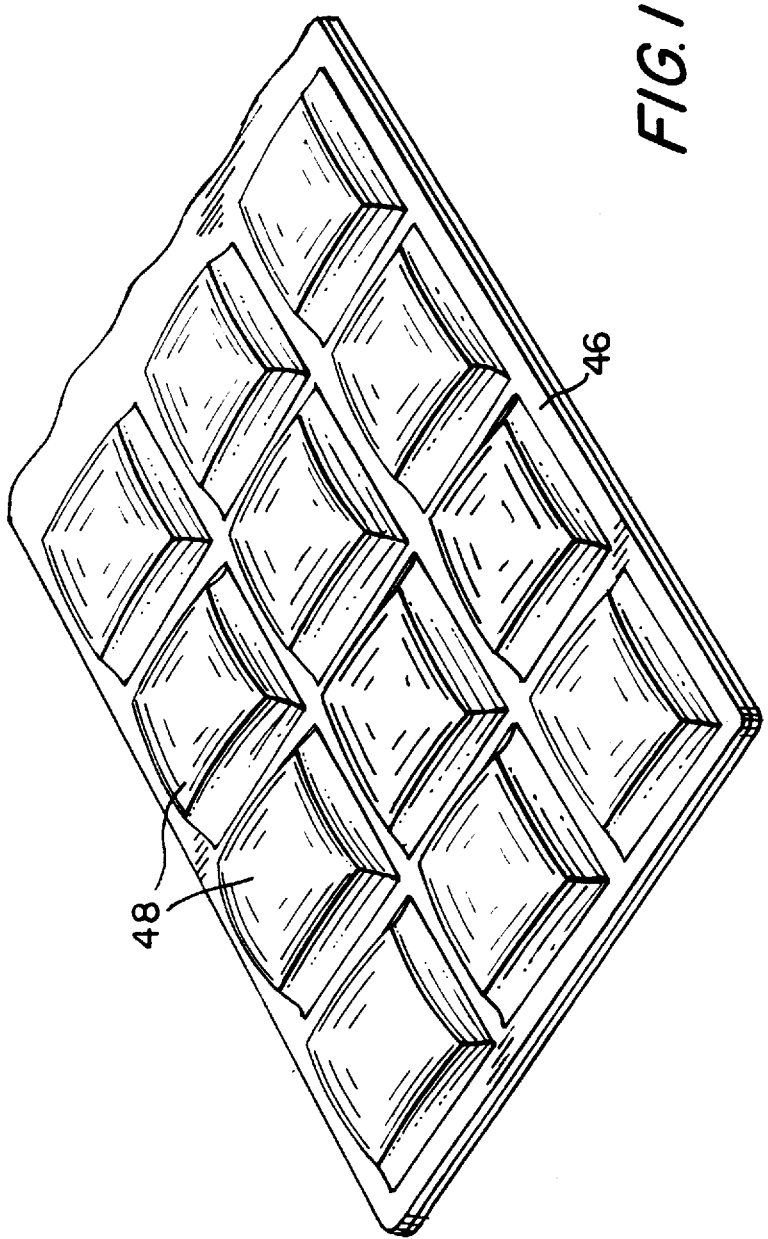
FIG. 1 is an encapsulated ice substitute belt, showing a plurality of capsules on the belt.

FIG. 1 shows a belt of encapsulated ice substitute 46 including a plurality of capsules 48. The liquid within the capsules is the object to be frozen using the presently invented apparatus and process. The capsule belt may be manufactured in any suitable manner, including blow molding, vacuum molding, machine forming from a continuous film and suitably sealing, filling with thermal controlling agent or refrigerant.

The capsule belt is formed with an outer skin 50 of a suitable non rigid or flexible material which is chosen according to the operating temperature of the assembly in which the capsule belt is to be used and the refrigerant which the capsules are to contain. The capsule belt is preferably of a suitable plastic material such as low temperature melting polyethylene, PVC, Teflon®, polypropylene, polycarbonate, nylon and the like. The capsule belt must be of a material which is resistant to a wide range of temperature variation.

Each capsule is filled with a thermal controlling agent or refrigerant ## which is chosen according to the desired operating temperature. The refrigerant ## is preferably a material which will change from one physical state to another, i.e. liquid to solid or vice versa, at a predetermined temperature, that is, the phase change temperature. The thermal controlling agent or refrigerant has the capacity to absorb or release heat with little or no change in temperature while in the process of changing from one physical state to another.

Although water is a possible refrigerant for the capsules, in one preferred embodiment the refrigerant is a eutectic solution, or a mixture of two or more substances which has a lower freezing point, known as the eutectic point, than either of the two substances taken individually. The solution may, for example, comprise a mixture or solution of an inorganic salt in water. The salt may, for example be chosen from the following class: sodium, calcium, ammonium, or potassium chloride; ammonium, magnesium, or sodium sulfate; potassium or sodium nitrate, among others which will be apparent to those skilled in the art.

The refrigerant or thermal controlling agent is formulated to maintain specific temperature ranges under controlled conditions once frozen. A range of different capsule belts containing different agents may be provided for various different applications.

The capsules of the capsule sheets may be formed to have many configurations, such as a square or a rectangular outline or generally a pillow like form. The capsule dimensions are preferably about 1"×1"×¼" to 3"×3"×¼. The capsules will be filled with 0.5 ml to 20 ml, preferably 2 to 4 ml, of thermal controlling agent, depending on the dimensions of the capsules.

Other aspects for preparing an ice substitute such as a capsule belt or sheet are described in detail in U.S. Pat. No. 4,931,333, which is herein incorporated by reference in its entirety.

In a preferred embodiment, the brine to be used to freeze the ice substitutes contains an inorganic salt, a glycol, water and an oil. Preferably, the is a cruciferous oil such as oil from a plant of the genus Brasica. These oils include, but are not limited to, oil of Brassica camperstris, otherwise known as rapeseed oil, and oil of Brassica hirta, known as mustard oil.

Rapeseed oil has a solidification point of −10° C., a specific gravity at 15° C. of 0.915, a refractive index at 50° C. of 1.4706, an iodine value of 98.6 and a saponification value of 174.7. The oil includes about 1% palmitic acid, the only saturated component of the oil, about 32% oleic acid, about 15% linoleic acid, about 1% linolenic acid and about 50% erucic acid. Palmitic acid, otherwise known as hexadecanoic acid is a saturated fatty acid having 16 carbon atoms and a molecular weight of 256.4.

Oleic acid, also known as (Z)-9-octadecenoic acid, has 18 carbon atoms and a molecular weight of 282.5. The position of unsaturation is between the ninth and tenth carbon atoms in the chain. The molecule has a cis configuration.

Linoleic acid has two positions of unsaturation and is also known as cis,cis-9,12-octadecadienoic acid. The acid has 18 carbon atoms and a molecular weight of 280.5.

Linolenic acid has three positions of unsaturation and is also known as (Z,Z,Z)-9,12,15-octadecatrienoic acid. Linolenic acid has 18 carbon atoms and a molecular weight of 278.4.

Erucic acid, a major component of the oils of the genus Brassica, is also known as (Z)-13-docosenoic acid. Erucic acid has 22 carbon atoms with one position of unsaturation and a molecular weight of 338.6.

Mustard oil is similar. Mustard oil has a specific gravity at 15° C. of 0.9145, a refractive index at 50° C. of 1.475, an iodine value of 102 and a saponification value of 174. Mustard oil includes 1.3% by weight myristic acid, the only saturated fatty acid, 27.2% by weight oleic acid, 16.6% by weight linoleic acid, 1.8% by weight linolenic acid, 1.1% by weight behenic acid, 1.0% by weight lignoceric acid and 51.0% by weight erucic acid. Myristic acid, also known as tetradecanoic acid, has 14 carbon atoms and a molecular weight of 228.4.

Behenic acid is also known as docosanoic acid. It has 22 carbon atoms and a molecular weight of 340.6. Lignoceric acid, also known as tetracosanoic acid, has 24 carbon atoms and a molecular weight of 368.6. The other components of mustard oil are described above.

The oil is used in an amount less than about 1% by weight, more preferably less than about 0.8% by weight and most preferably between about 0.1 and 0.5% by weight of the brine.

It is to be understood that oils other than rapeseed oil and mustard oil can be used in accordance with the invention. For example, synthetic oils having the characteristics described would be useful. In addition, the manner in which the oils function is described in detail below and it will be readily apparent that other oils will function acceptably in accordance with the invention and can be readily determined.

In addition to the cruciferous oil, the brine also generally includes a glycol. Suitable glycols include, but are not limited to, ethylene glycol, propylene glycol, benzylene glycol, butylene glycol, diethylene glycol, diphenyl glycol, ethylidene glycol, and the like. Any glycol can be used alone or in combination with other glycols. Propylene glycol is used in a preferred embodiment. The glycol component is present in an amount between about 30 and 50% by weight of the brine, more preferably between about 35 and 45% by weight and most preferably in an amount of about 40% by weight.

Salts which are useful in accordance with the invention include, but are not limited to, calcium chloride, calcium bromide, calcium iodide, potassium chloride, potassium bromide, potassium iodide and the like. In a preferred embodiment, calcium chloride is used. The salt is present in an amount between about 5 and 15% by weight of the brine, more preferably in an amount between about 7 and 13% by weight and most preferably in an amount of about 10% by weight.

Water makes up the balance of the brine and is thus present in an amount between about 40 and 60% by weight, more preferably in an amount between about 45 and 55% by weight and most preferably in an amount of about 50% by weight.

In an especially preferred embodiment, the brine has the following composition:

| Component | Amount (% by weight) |
| --- | --- |
| Cruciferous oil | 0.1–0.5 |
| Propylene glycol | 40 |
| Calcium chloride | 10 |
| Water | about 50 |

The cruciferous oil is preferably rapeseed oil, mustard oil or a mixture thereof.

The inventor has discovered that the brine prepared according to this method is especially useful for freezing such articles, that is eutectic solutions encapsulated in a plastic envelope.

Figure 2:
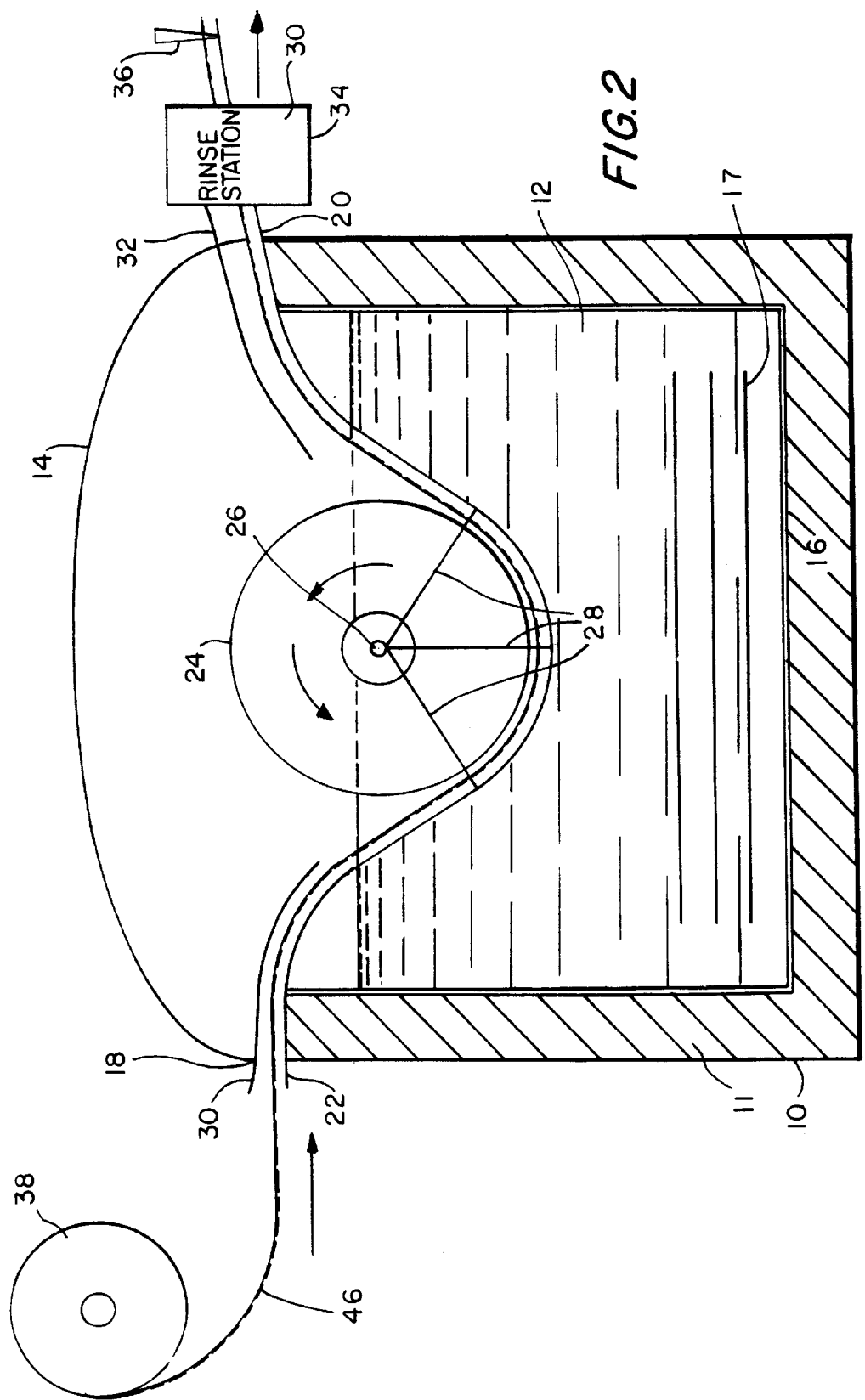
FIG. 2 is a schematic end cross-section of the freezing apparatus as it freezes the ice substitute belts.

Referring now to FIG. 2, an apparatus for freezing ice substitutes such as a capsule belt or sheet 46 generally includes a freezer 10, preferably a TruFresh® freezer, including a tank 11 which contains a brine 12 and preferably has a cover 14. Inside and at the bottom 16 of the freezer is one or more cooling coils 17 for maintain the brine 12 at a preselected temperature, preferably between −22° to −43.6° F. The freezer 10 has a slot 18 on the inlet side of the tank 11 for feeding capsule belt or sheet 46 into the tank 11 and another slot 20 on the outlet side opposite to the inlet side for exiting, ice substitutes once the freezing process is completed. The slots are defined by top guides 30 and 31 and an arcuate bottom guide 22. The bottom guide 22 continuously extends from inlet slot 18 to outlet or exit slot 20 with the middle part of the guide immersed in the brine 12. The first top guide 30 extends from inlet side of the tank 11 part way into the tank 11 and the second top guide 31 extends from outlet side part way into the tank 11, both being closely spaced from and above the bottom guide 22. The ends of the top guides 30 and 31 inside the tank 11 define a space where a roller 24 is mounted on bearings 26 which are supported by supports 28 preferably secured to the tank 11. The roller 24 is closely spaced from and above the bottom guide 22. Preferably the cylindrical periphery of roller 24 is substantially hollow and preferably formed of mesh which is preferably yieldable so as to be able to ride over high spots on the capsule belt 46. Alternatively, bearings 26 may be movably mounted and yieldably hold as by springs to accomplish the same end as acheived by a yieldable roller. The brine 12 is preferably filled up to a sufficient level to cover about two thirds of the drive wheel 24. Top guides 30 and 31 together with bottom guide 22 direct the capsule belt 46 in and out of the freezer tank 11 through the inlet slot 18 and outlet slot 20. A drip station 32, preferably formed as an extension of top guide 30 and bottom guide 22, is located between the outlet slot 20 to catch brine dripping from capsule belt or sheet 46 as it emerges from tank 11, and a rinse station 34 to wash the remaining brine off of the capsule sheet or belt 46. A cutter 36 is installed next to the rinse station 34 for cutting the frozen capsule belt or sheet 46 into preselected discrete desired lengths for use in wrapping items once the freezing process is completed.

In operation, the capsule belt 46 is unrolled from a roll stock 38 through the inlet slot 18 and into the freezer tank I 1, between the top guide 30 and the bottom guide 22. When the capsule belt 46 reaches the bottom of the roller 24, the roller 24 engages or grasps the capsule belt 46 by pressing it against the bottom guide. The capsule belt 46 is thus moved by the rolling movement of the roller 24. In this fashion, the capsule belt 46 may be moved from the inlet side, down to the bottom of the roller 24, then back up to the outlet side, and out of the freezer tank 11. To achieve maximum contact between the brine 12 and capsule sheet 46, it is preferred to have a mesh roller which permits the brine 12 to freely flow through the mesh roller. Once the frozen capsule belt or sheet leaves the tank 11, it may be advanced continuously by the rolling movement of roller 24 to the drip station 32 where the brine drips from the capsule belt or sheet. Then the capsule belt or sheet 46 may be forwarded to the rinse station to wash the remaining brine off of the capsule belt or sheet. The capsule belt or sheet 46 may be finally moved to the cutter to cut into preselected desired lengths for intended use.

Figure 3:
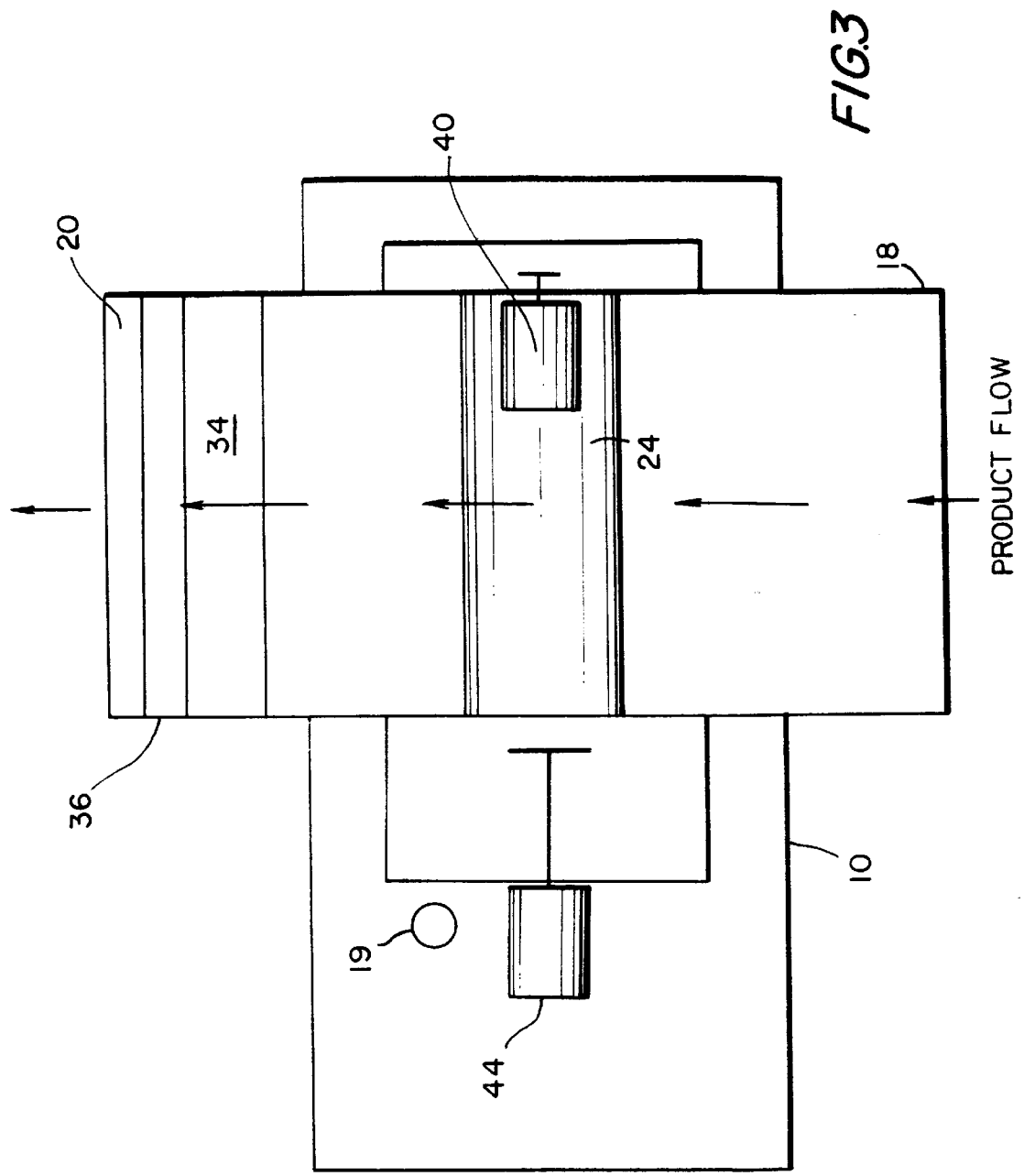
FIG. 3 is a schematic top view of the freezing apparatus without the cover, showing the direction of ice substitute movement which is controlled by the drive wheel.

FIG. 3 is a top view of the apparatus of FIG. 2 for freezing ice substitute. As shown in FIG. 3, the roller 24, the top guide 30 (FIG. 1) and the bottom guide 22 (FIG. 1) preferably all have substantially the same width. The roller 24 is preferably adjustably driven by a drive motor 40 at a speed that allows the capsule belt to stay in the brine 12 sufficiently long for the thermal controlling agent encapsulated in the capsules to become solidified. The time required for solidifying the thermal controlling agent depends on the compositions of the agents in use, i.e. the combinations of salts, oil and water, and the speed of the roller. Thus, in the preferred process and apparatus, the freezing time period is a function of the speed of the roller and the composition of the thermal controlling agent. A suitable roller speed in correlation to a given composition of the thermal controlling agent can be readily determined by those skilled in the art. Of course, the motor does not have to drive the roller at variable speed in which case it is preferred that the fixed speed be selected to assure that the thermal controlling agent that takes the longest to freeze will be frozen when it exits tank 11.

The drive motor 40 may be connected to a recorder (not shown) to establish the running time at each speed setting graphically with RPM on one axis and time on the other for billing purposes.

Figure 4:
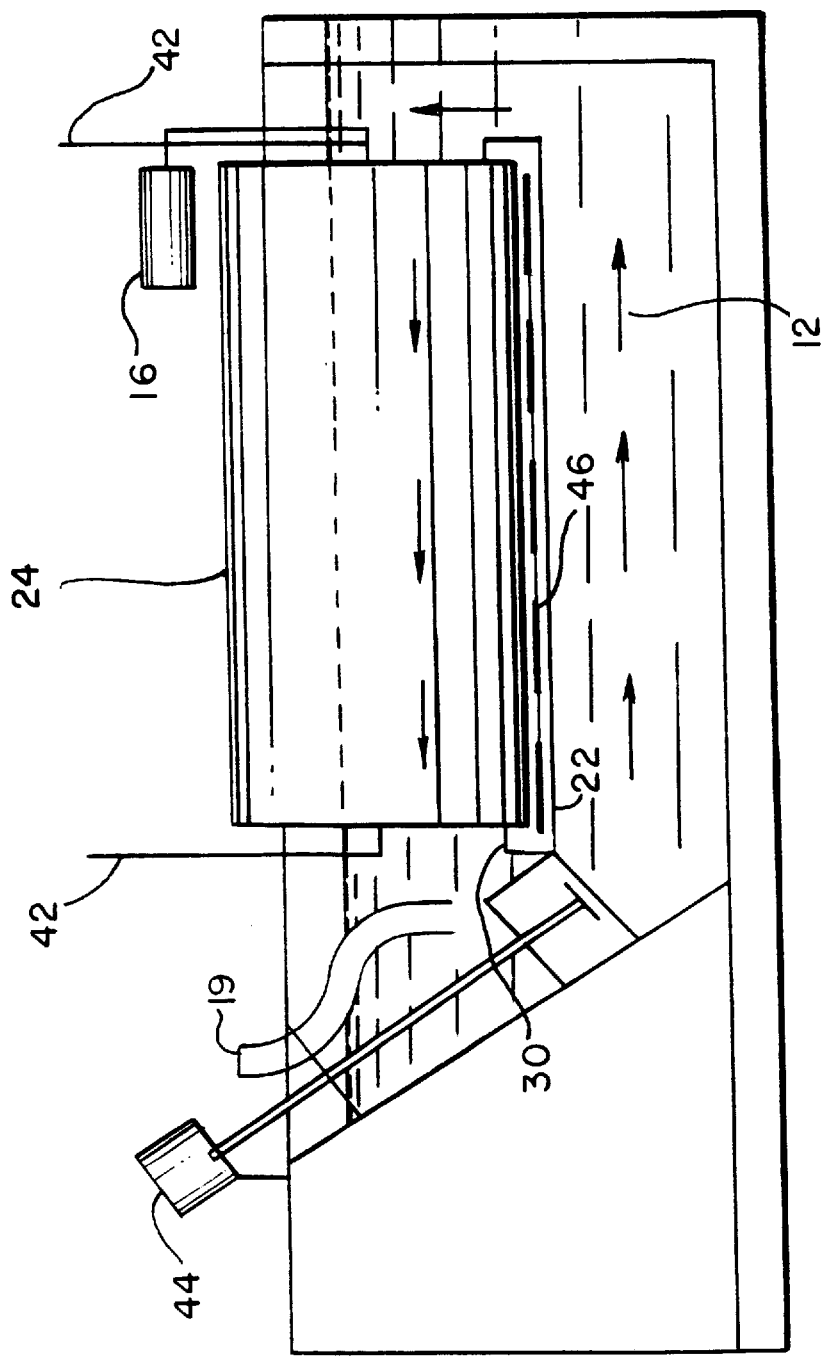
FIG. 4 is a schematic side cross-section of the freezing apparatus, showing the direction of the brine flow which is generated by the brine mix motor.

As shown in FIG. 4, a pressure guide 42 provides for movement of bearings 26 and roller 24 toward and away from bottom guide 22 in order to facilitate the threading of capsule belt 46 through the machine. Once the capsule belt is threaded the pressure guide may be fixed to hold the axis of the roller fixed, save for the yieldable mounting of bearings 26 as hertofore described. The space between the roller 24 and the bottom guide tray 22 may be adjusted for various dimensional variations but still maintain enough contact to drive the capsule belt 46 through the brine 12 and back up and out. The brine 12 may be homogenized by a brine mix motor 44 which may be placed at the back of the roller 24 to maintain an even temperature of the brine 12, although other suitable locations may be used. While the brine 12 is mixed by the brine mix motor 44, the brine 12 flows in a direction (shown by the arrows in FIG. 4) perpendicular to the movement of the ice substitute belts. A dip sample fill port 46 serves as an access to the brine to test its temperature and composition as and when it is deemed necessary or desirable.

The capsule belt or sheet so prepared may be used for shipping a large variety of temperature sensitive products, such as foods and other produce. They can be used for covering fresh produce, for shipment of medical diagnostic products, biological specimens, and for transport of organs for transplant. The capsule belts can also be used as hot and cold packs for wrapping around injured limbs and the like, for example for athletes, or for animals.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. An apparatus for freezing a belt of encapsulated ice substitute, comprising
    a tank for containing a brine including an oil, salts and a glycol, said tank having an inlet side and an outlet side for permitting said ice substitute belt entry into and exiting from said tank,
    means for guiding said ice substitute belt into, through and out of said brine in said tank, said guiding means including a downwardly arcuate bottom guide disposed in said tank and extending from said inlet side to said outlet side through said tank for guiding said ice substitute belt through said brine in said tank,
    a roller rotatably mounted relative to said tank and above and closely spaced from said bottom guide at a location where said bottom guide is immersed in said brine in said tank for contacting and advancing said ice substitute belt on said bottom guide, said roller being connectable to a motor means for rotatably driving said roller, and
    means for cooling said brine to a temperature between about −22° and about −43.6° F.

2. The apparatus of claim 1, further comprising a drive motor for adjustably rotating said drive wheel.

3. The apparatus of claim 1, further comprising a pressure guide for adjustably positioning said drive wheel against said ice substitute so as to maintain the contact between said drive wheel and said ice substitute for moving said ice substitute.

4. The apparatus of claim 1, further comprising a first top guide above and closely spaced from said bottom guide and extending from said inlet side of said tank part way into said tank to define an entry slot for said ice substitute belt, a second top guide in closely spaced relation with said lower guide and extending from outlet side of said tank part way into said tank to define an exit slot for said ice substitute belt, the ends of said first and second top guides in said tank defining a space therebetween, wherein said roller is disposed in said space.

5. The apparatus of claim 1, further comprising means for supplying said ice substitute belt for introduction into said tank through said inlet side and means for collecting said ice substitute belt after passage through said outlet side.

6. The apparatus of claim 1, further comprising a rinse station for rinsing said brine off said ice substitute belt on said outlet side of said tank.

7. The apparatus of claim 1, further comprising a cutter for cutting said ice substitute belt into preselected lengths.

8. The apparatus of claim 1, wherein said roller is substantially hollow and the periphery of said roller is made of a mesh which permits said brine to freely flow through said roller so as to maintain a maximum contact between said brine and said ice substitute.

9. The apparatus of claim 1, further comprising means for mixing said brine and keeping said brine flowing in said tank so as to maintain a homogeneous temperature of said brine.

10. The apparatus of claim 1, wherein the oil in said brine a cruciferous oil selected from the group consisting of rapeseed oil, mustard oil and mixtures thereof in an amount between about 0.1 and about 1.0% by weight, the glycol in said brine is propylene glycol in an amount between about 30 and about 50% by weight, the salt in said brine is calcium chloride in an amount between about 5 and about 15% by weight, and the balance of the brine is water.

11. The apparatus of claim 10, wherein said cruciferous oil is in an amount between about 0.1 and about 0.5% by weight, said propylene glycol is in an amount of about 40% by weight, said calcium chloride is in an amount of about 10% by weight, and the balance is water.

12. A process for freezing a belt of encapsulated ice substitute containing a thermal controlling agent which is a liquid having a freezing point within a predetermined temperature range in a brine including a cruciferous oil, a salt and a glycol, comprising the steps of:
    a) cooling said brine to a temperature between about −22° and −43.6° F.;
    b) introducing said belt of encapsulated ice substitute into said cooled brine;
    c) moving said ice substitute belt through said cooled brine by a rotating a roller engaging said belt until said thermal controlling agent forms a solid phase;
    d) then removing said ice substitute belt with the solid phase thermal controlling agent from said tank.

13. The process of claim 12, further comprising the step of controlling the speed of the belt as it travels through said brine so that said ice substitute belt will be immersed in said brine for a sufficient time to permit said thermal controlling agent to form a solid phase.

14. The process in claim 12, further comprising the step of moving said ice substitute belt having said solid thermal controlling agent to a rinse station for rinsing said brine off said belt.

15. The process in claim 12, further comprising the step of moving said ice substitute belt from said rinse station to a cutter for cutting said belt into preselected lengths.

16. The process for freezing ice substitute of claim 12, wherein said ice substitute belt comprises a continuous sheet containing a plurality of rows of adjacent reusable capsules, each capsule containing said thermal controlling agent, each row being separate from the next adjacent row by a first set of spaced seal lines and the capsules in each row being separate from one another by a second set of spaced seal lines perpendicular to the first set, each capsule having a generally rectangular outer periphery and opposing curved outer surfaces on the upper and lower face of the sheet, the thermal controlling agent being a liquid in a predetermined temperature range and being freezable into a solid phase prior to use, and the sheet being selectively bendable along both sets of perpendicular seal lines when the thermal controlling agent is solidified.

17. The process of claim 12, wherein said thermal controlling agent is a eutectic solution capable of simultaneously having a liquid phase and a solid phase.

18. The process of claim 12, wherein said thermal controlling agent is an aqueous solution of 3% by weight polyethylene glycol having a molecular weight in the range from about 7,000 to about 9,000.

19. The process of claim 12, wherein said capsule volume is in the range about ¼ to ¾ cubic inch.

20. The process of claim 12, wherein the oil in said brine a cruciferous oil selected from the group consisting of rapeseed oil, mustard oil and mixtures thereof in an amount between about 0.1 and about 1.0% by weight, the glycol in said brine is propylene glycol in an amount between about 30 and about 50% by weight, the salt in said brine is calcium chloride in an amount between about 5 and about 15% by weight, and the balance of the brine is water.

21. The method of claim 20, wherein said cruciferous oil is in an amount between about 0.1 and about 0.5% by weight, said propylene glycol is in an amount of about 40% by weight, said calcium chloride is in an amount of about 10% by weight, and the balance is water.

* * * * *